UNITED STATES PATENT OFFICE.

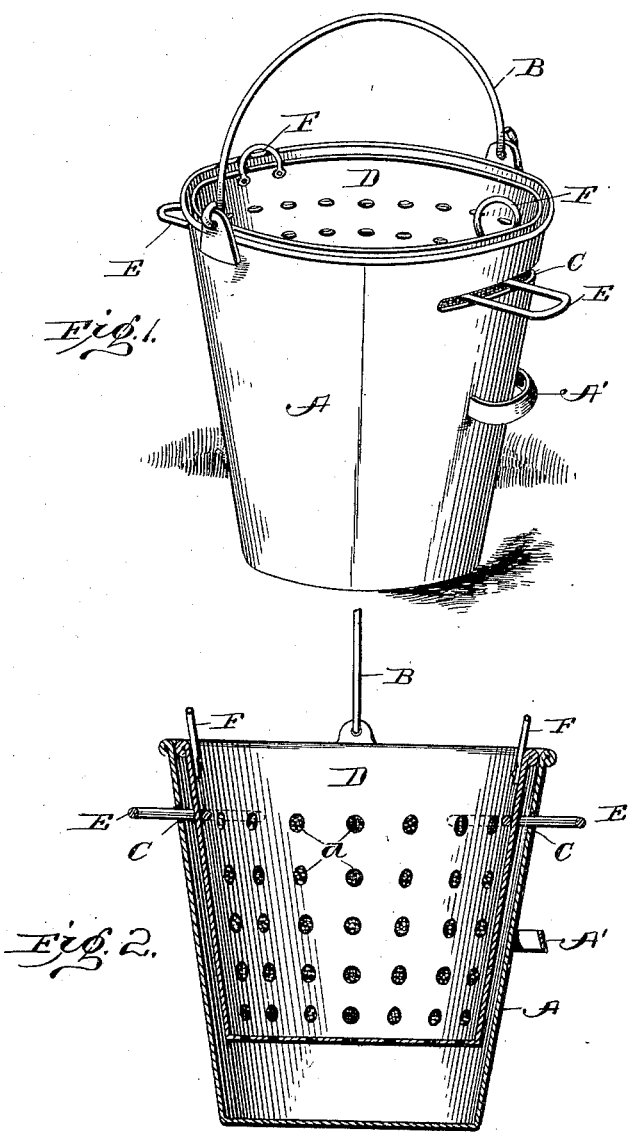

SARA C. HART, OF GALVESTON, TEXAS.

ASH-SIFTER.

SPECIFICATION forming part of Letters Patent No. 662,269, dated November 20, 1900.

Application filed January 3, 1900. Serial No. 250. (No model.)

*To all whom it may concern:*

Be it known that I, SARA C. HART, a citizen of the United States, and a resident of Galveston, in the county of Galveston and State of Texas, have invented certain new and useful Improvements in Ash-Sifters; and I do hereby declare the following to be a full, clear, and exact description of the same, reference being had to the accompanying drawings, forming a part of this specification, and to the letters of reference marked thereon.

This invention has for its object to provide a receptacle for ashes and cinders which, while of a size adapted to be conveniently handled, may also be utilized as a sifter or screen for separating the unconsumed particles of coal and cinders from the ashes and at the same time confine the dust, so as to prevent its flying about, &c.

Referring to the accompanying drawings, Figure 1 is a perspective view of an ash receptacle and separator embodying my present improvements. Fig. 2 is a vertical section through the same with the supporting-handles for the foraminous receptacle shown extended through the slots in the outer receptacle in full lines and pressed inwardly to permit of the removal of the said foraminous receptacle in dotted lines.

Similar letters of reference in both figures indicate the same parts.

In order to carry out the objects of the present invention, I provide an outer receptacle, lettered A in the accompanying drawings, which receptacle is preferably in the form of a bucket substantially circular in cross-section and preferably rather deeper than an ordinary coal-hod, although it may be of any desired depth. This receptacle is provided with a bail or suitable handle B, by means of which it may be transported, and a hand hold A', for convenience in dumping the ashes or other material from the receptacle.

At diametrically opposite points in the walls of the receptacle horizontally-extending slots or guides C are formed, and within the receptacle I locate a second receptacle D, the latter being, if desired, of substantially the shape of the outer receptacle, but slightly smaller in diameter or tapering more sharply and of less height. The inner receptacle D is made foraminous, and it is provided with radially-movable operating-handles E, which when the inner receptacle is put into position may be slipped inwardly, as indicated by the dotted lines in Fig. 2, and then passed out through the slots C in the walls of the outer receptacle, thereby supporting the inner receptacle movably within the outer receptacle. This inner receptacle D is made foraminous, as shown at $d$, the apertures preferably being located in the side walls as well as in the bottom, and the upper edge of the said inner receptacle is preferably made to fit the outer receptacle, so as to leave but a very small annular opening, through which little or no dust can escape.

For convenience in handling the inner receptacle it may be provided with side bails or handles F, projecting up above its edge, or, if desired, a suitable bail may be provided and a cover or other closure may be employed for keeping the dust down.

In the practical utilization of the invention the ashes and cinders are taken directly from the ash-pit of the stove and placed in the inner receptacle, which has previously been placed in the outer receptacle. This having been done, the two receptacles may be removed to a convenient spot and the inner receptacle agitated by means of the handles passing through the slots in the side walls of the outer receptacle. This agitation may be either a reciprocation in a horizontal plane or a jogging up-and-down motion effected by working the handles, or one of them, up and down, the handle operating as a lever pivoting on the lower edge of the slot.

Having thus described my invention, what I claim is—

1. In a domestic ash and cinder receptacle and separator, the combination with the outer receptacle having a carrying-handle, of the inner foraminous receptacle, having oppositely-projecting and inwardly-movable handles, with bearings on the outer receptacle with which said handles coöperate to support the inner receptacle; substantially as described.

2. In a device such as described, the combination with the outer receptacle, having slotted bearings in its side wall, of the inner foraminous receptacle fitting within the outer receptacle and having radially-movable handles adapted to project through the slots in the outer receptacle; substantially as described.

3. In a device such as described, the combination with the outer receptacle, having the carrying-handle, of the inner foraminous receptacle fitting within the outer receptacle and having carrying-handles projecting above the top of the outer receptacle, the radially-movable handles carried by the inner receptacle, and the horizontal slot-bearings in the outer receptacle with which said handles cooperate; substantially as described.

SARA C. HART.

Witnesses:
GUS ARNOLD,
D. J. MAY.